(12) United States Patent
Toth

(10) Patent No.: US 11,149,851 B2
(45) Date of Patent: Oct. 19, 2021

(54) PISTON RING WITH WEAR RESISTANT COATING

(71) Applicant: Tenneco Inc., Lake Forest, IL (US)

(72) Inventor: James Robert Toth, Ann Arbor, MI (US)

(73) Assignee: Tenneco Inc., Southfield, MI (US)

( * ) Notice: Subject to any disclaimer, the term of this patent is extended or adjusted under 35 U.S.C. 154(b) by 57 days.

(21) Appl. No.: 16/130,504

(22) Filed: Sep. 13, 2018

(65) Prior Publication Data

US 2020/0088297 A1 Mar. 19, 2020

(51) Int. Cl.
| | | |
|---|---|---|
| *F16J 9/26* | (2006.01) | |
| *C23C 18/52* | (2006.01) | |
| *C23C 18/50* | (2006.01) | |
| *C23C 18/16* | (2006.01) | |

(52) U.S. Cl.
CPC .............. *F16J 9/26* (2013.01); *C23C 18/1651* (2013.01); *C23C 18/50* (2013.01); *C23C 18/52* (2013.01)

(58) Field of Classification Search
CPC ........ F16J 9/26; C23C 18/1651; C23C 18/50; C23C 18/52
See application file for complete search history.

(56) References Cited

U.S. PATENT DOCUMENTS

| | | | |
|---|---|---|---|
| 4,610,763 A | | 9/1986 | Law |
| 6,013,380 A | * | 1/2000 | Harayama ................ C25D 5/18 277/440 |
| 6,054,225 A | * | 4/2000 | Harayama ................ C25D 5/18 205/109 |
| 7,887,930 B2 | | 2/2011 | Bishop et al. |
| 7,910,231 B2 | | 3/2011 | Schuh et al. |
| 8,273,466 B1 | | 9/2012 | Saraiya et al. |
| 2011/0115167 A1 | * | 5/2011 | Linde ......................... F16J 9/26 277/434 |
| 2011/0132765 A1 | | 6/2011 | Bishop et al. |
| 2015/0361571 A1 | | 12/2015 | Miettinen et al. |
| 2016/0333494 A1 | | 11/2016 | Miettinen et al. |
| 2017/0009350 A1 | * | 1/2017 | Myllymaki ............. C23C 18/34 |
| 2017/0159198 A1 | | 6/2017 | Miettinen et al. |

FOREIGN PATENT DOCUMENTS

| | | | | |
|---|---|---|---|---|
| CA | 2897265 A1 | * | 7/2014 | ......... C23C 18/1694 |
| WO | WO-2014126066 A1 | * | 8/2014 | ............... C25D 5/50 |

* cited by examiner

*Primary Examiner* — Gilbert Y Lee
(74) *Attorney, Agent, or Firm* — Robert L. Stearns; Dickinson Wright, PLLC

(57) ABSTRACT

A wear resistant coated piston ring for an engine is provided. The piston ring includes a coating disposed on a ring body. The coating includes initially includes alternating first and second layers, wherein the first layers include trivalent chromium, and the second layers include nickel and phosphorous. The first layers are applied by depositing a trivalent chromium electrolyte, specifically Cr3+ electrolyte. The second layers are applied by electroless deposition. The coating is left in the as-is condition and is not heat treated before being disposed on a piston and then in an engine. The coating is naturally exposed to heat while the engine is running, and this heat causes the chromium, nickel, and phosphorous of the layers to diffuse and form a surface layer on a compound layer. The surface layer includes trivalent chromium, and the compound layer includes a ternary compound of chromium, nickel, and phosphorous.

13 Claims, 1 Drawing Sheet

PISTON RING WITH WEAR RESISTANT COATING

BACKGROUND OF THE INVENTION

1. Field of the Invention

The invention relates generally to piston rings for internal combustion engines, and more particularly to coated piston rings, and methods of manufacturing the coated piston rings.

2. Related Art

A piston of a reciprocating engine, such as an internal combustion engine, typically includes rings disposed in grooves along the outer diameter of the piston. The piston rings facilitate guiding of the piston during reciprocation in a cylinder bore. The piston rings also seal combustion gases and inhibit the upward passage of oil. The piston rings are subject to wear as they move along the cylinder bore due to gas load and their own inherent load. Accordingly, the piston rings are typically coated or treated to enhance wear resistance. For example, the piston rings may be nitrided, coated with chromium, such as hexavalent chromium, or coated with a ceramic.

SUMMARY OF THE INVENTION

One aspect of the invention provides a coated piston ring for an engine. The piston ring comprises a ring body extending circumferentially around a center axis. The piston ring also includes a coating disposed on the ring body and presenting an outer diameter surface of the piston ring. Initially, upon application, the coating includes a plurality of first layers and a plurality of second layers. The second layers space the first layers from one another. The first layers include trivalent chromium, and the second layers include nickel and phosphorous.

Another aspect of the invention provides a piston ring which has been naturally exposed to heat from an engine. The piston ring comprises a ring body extending circumferentially around a center axis. A coating is disposed on the ring body and presents an outer diameter surface of the piston ring. The coating including a surface layer disposed on a compound layer. The surface layer includes chromium, and the compound layer includes chromium, nickel, and phosphorous.

Yet another aspect of the invention provides a method of manufacturing a piston ring. The method comprising the steps of providing a ring body extending circumferentially around a center axis; and applying a coating to the ring body. The step of applying the coating includes applying a plurality of first layers and applying a second layer between each of the first layers. The first layers include trivalent chromium and the second layers including nickel and phosphorous.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF AN EXAMPLE EMBODIMENT

Figure 1:
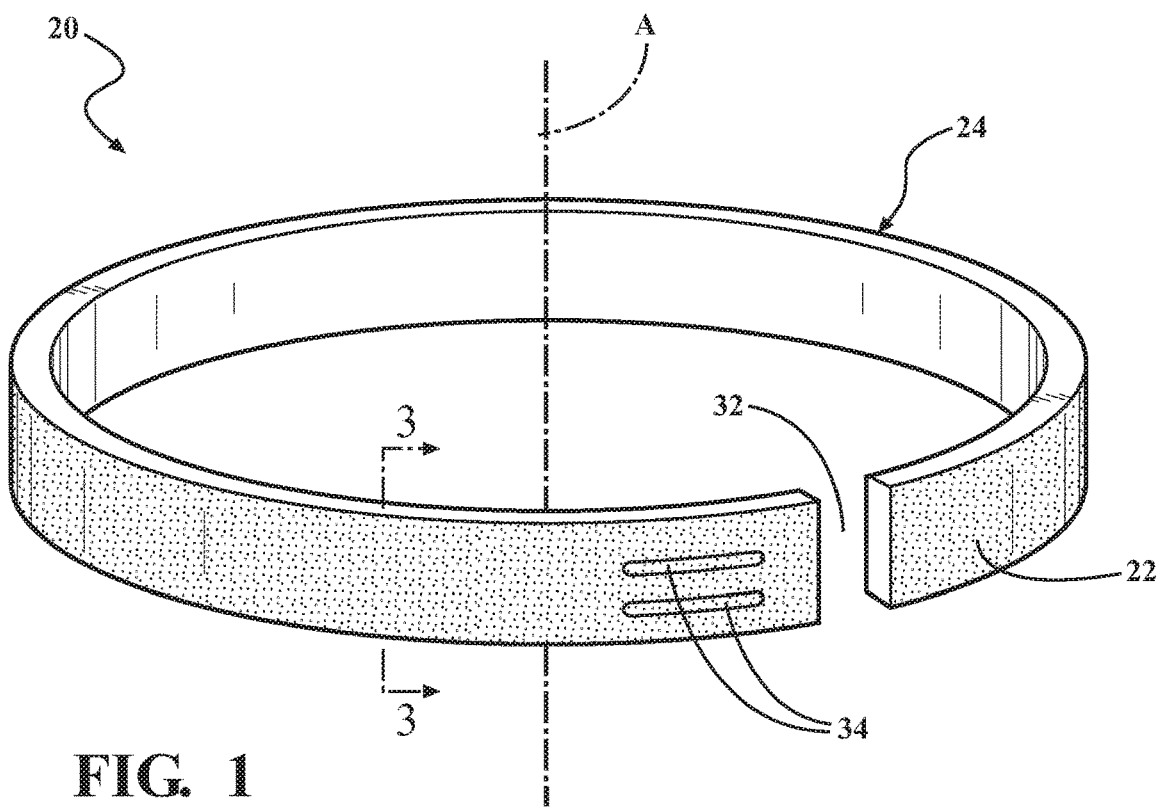
FIG. 1 is a perspective view of a coated piston ring according to one exemplary embodiment.

One aspect of the invention provides a piston ring 20 including a coating 22 for providing wear resistance when used in a reciprocating engine application, such as an internal combustion engine application. FIG. 1 shows an example of the coated piston ring 20 according to an exemplary embodiment. The piston ring 20 comprises a ring body 24 extending circumferentially around a center axis A. The ring body 24 presents an outside surface 26, an inside surface 28 facing opposite the outside surface 26, and edge surfaces 30 spacing the outside surface 26 from the inside surface 28. The edge surfaces 30 can be parallel to one another or extend at an angle inwardly from the outside surface 26 to the inside surface 28. The ring body 24 is formed of an iron-based material, and the iron-based material typically includes steel, steel alloy, cast iron, cast iron alloy, nodular iron, cast steel, or another iron-based material capable of handling the conditions of a reciprocating engine. For example, the iron-based material could be an alloy referred to as KV1, KV4, 9254 steel, or other alloys commonly used to manufacture piston rings. The iron-based material presents the inside surface 28 facing opposite the outside surface 26, and the edge surfaces 30.

In the exemplary embodiment, the ring body 24 is split such that it presents an opening 32 along each of the surfaces 26, 28, 30. The ring body 24 may be full-face, semi-inlaid, or fully-inlaid. The ring body 24 may also present at least one groove 34, or a plurality of grooves 34, along the outside surface 26, as shown in FIG. 1.

The coating 22 is applied to the ring body 24 and then left as-is when disposed on a piston for use in an engine, for example an internal combustion engine. The coating 22 is not heat treated before being applied to the ring body 24 or before being used in an engine.

Figure 2:
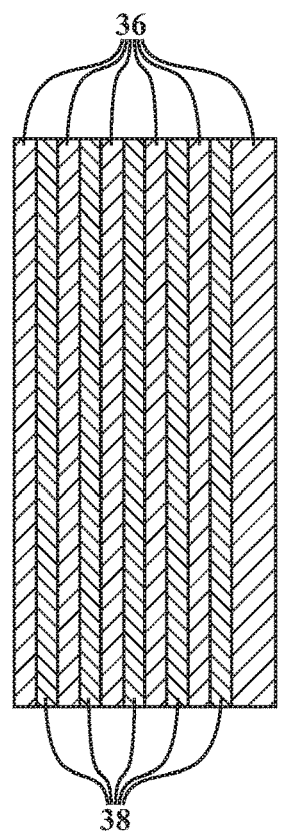
FIG. 2 is a cross-sectional view of a coating applied to the outside diameter surface of the ring body used to form the coated piston ring of FIG. 1.

As shown in FIG. 2, the coating 22 includes a plurality of alternating first layers 36 and second layers 38. The second layers 38 space the first layers 36 from one another. The first layers 36 include trivalent chromium and the second layers 38 include nickel and phosphorous. One of the first layers 36 forms the outer diameter surface of the coating 22. The first layers 36 are formed from a trivalent chromium electrolyte (Cr3+) and the second layers 38 are formed by electroless deposition.

In the example embodiment, the one first layer 36 forming the outer diameter surface of the coating 22 has a thickness greater than the thickness of the other layers of the coating 22. According to a more specific example, the layers 36, 38, other than the layer forming the outermost surface, could have a nominal thickness of 1 micron, and the one layer forming the outermost surface could have a thickness greater than 1 micron. The total thickness of the coating 22 ranges from 50 to 200 microns.

The coating 22 is not heat treated prior to being disposed in an engine. However, when the coating 22 is exposed to the heat of the engine, the chromium, nickel, and phosphorous present in the layers 36, 38 diffuse to form a surface layer 40 including chromium and presenting the outer diameter surface of the coating 22, and a compound layer 42 including chromium, nickel, and phosphorous. The compound layer 42 includes a ternary compound of chromium, nickel, and phosphorous which is very hard and results in a very low wear rate and a very stable piston ring 20, similar to a PVD coating. Typically, the first layers 36 of the coating 22 have a hardness around 750 HV, which is softer than existing hexavalent based coatings, which typically have a hardness around 1000 HV.

Another advantage provided by the coating 22 is that it includes trivalent chromium (Cr3+) instead of hexavalent chromium (Cr6+), and thus Cr6+ is eliminated from all processing steps. This is an advantage in manufacturing as possible exposure of a worker to toxic Cr6+ is eliminated, and the possible exposure of others to Cr6+ outside of the plant through malfunction of exhaust systems, and waste water treatment issues associated with Cr6+ are also eliminated.

Another aspect of the invention provides a method of manufacturing the piston ring 20. The method includes the steps of providing the ring body 24, and applying the coating 22 to the ring body 24. The step of applying the coating 22 includes applying a plurality of the first layers 36 and applying one of the second layers 38 between each of the first layers 36. The first layers 36 include trivalent chromium and the second layers 38 include nickel and phosphorous. In the example embodiment, the step of applying the first layers 36 includes depositing a trivalent chromium electrolyte (Cr3+), which is an electrolyte containing chromium, and the step of applying the second layers 38 includes electroless deposition. The electroless deposition or plating is also referred to as chemical plating and does not require external electrical power.

The coating 22 is not heat treated before the coated piston ring 20 is disposed on a piston or before the coated piston ring 20 is used in an engine. The coating 22 is left in the as-is or as-applied condition. Thus, the method includes disposing the coated piston ring 20 on a piston, for example in a top ring groove of the piston. The method further includes disposing the piston and the coated piston ring 20 in an engine, for example an internal combustion engine, and running the engine without heat treating the piston ring 20 before running the internal combustion engine.

While the engine is running, the coating 22 is naturally exposed to heat over a period of time. The heat from the running engine causes the chromium, nickel, and phosphorous of the layers 36, 38 to diffuse and form the surface layer 40 on the compound layer 42. The surface layer 40 includes chromium and the compound layer 42 includes chromium, nickel, and phosphorous. The compound layer 42 formed includes the ternary compound of chromium, nickel, and phosphorous which is very hard and results in a very low wear rate and a very stable piston ring, similar to a PVD coating. Using the natural heat from the engine, rather than performing a heat treatment process before using the piston ring 20 in the engine, avoids exposure to the excessive temperature associated with the heat treatment process and results in the formation of a very hard layer of material that will be stable and very wear resistant, similar to a PVD coating.

Many modifications and variations of the present invention are possible in light of the above teachings and may be practiced otherwise than as specifically described while within the scope of the claims. It is also contemplated that all features of all claims and of all embodiments can be combined with each other, so long as such combinations would not contradict one another.

What is claimed is:

1. A piston ring, comprising:
   a ring body extending circumferentially around a center axis;
   a coating disposed on said ring body and presenting an outer diameter surface of said piston ring;
   said coating including a plurality of first layers and a plurality of second layers, said second layers spacing said first layers from one another; and
   said first layers including trivalent chromium and said second layers including nickel and phosphorous.

2. The piston ring of claim 1, wherein one of said first layers forms said outer diameter surface of said coating.

3. The piston ring of claim 2, wherein said coating has a total thickness of 50 to 200 microns, said one first layer forming said outer diameter surface has a thickness greater than the thickness of the other layers of said coating.

4. The piston ring of claim 1, wherein said first layers are formed from a trivalent chromium electrolyte and said second layers are formed by electroless deposition.

5. The piston ring of claim 1, wherein said ring body is formed of an iron-based material.

6. The piston ring of claim 5, wherein said iron-based material includes steel, steel alloy, cast iron, cast iron alloy, nodular iron, or cast steel.

7. The piston ring of claim 5, wherein said iron-based material presents an inside surface of said ring body facing opposite said outer diameter surface.

8. The piston ring of claim 1, wherein said ring body extends circumferentially around a center axis, and said ring body includes side surfaces spacing said inner diameter surface from said outer diameter surface.

9. A method of manufacturing a piston ring, comprising the steps of:
   providing a ring body extending circumferentially around a center axis; and
   applying a coating to the ring body;
   the step of applying the coating including applying a plurality of first layers and applying a second layer between each of the first layers, the first layers including trivalent chromium and the second layers including nickel and phosphorous.

10. The method of claim 9, wherein the step of applying the first layers includes depositing a trivalent chromium electrolyte, and the step of applying the second layers includes electroless deposition.

11. The method of claim 9 including disposing the piston ring on a piston, disposing the piston and the piston ring in an engine, and running the engine without heat treating the piston ring before running the engine.

12. The method of claim 11, wherein while the engine is running, the chromium, nickel, and phosphorous of the layers diffuse and form a surface layer on a compound layer, the surface layer including chromium and the compound layer including chromium, nickel, and phosphorous.

13. A piston ring made according to the method of claim 9,
   wherein said coating is disposed on said ring body and presents an outer diameter surface of said piston ring;
   said coating includes a surface layer disposed on a compound layer; and
   said surface layer including chromium and said compound layer including chromium, nickel, and phosphorous.

* * * * *